US008640881B2

(12) United States Patent
Hartmann

(10) Patent No.: US 8,640,881 B2
(45) Date of Patent: Feb. 4, 2014

(54) SCREEN CHANGER

(75) Inventor: Frank Hartmann, Steinfurt (DE)

(73) Assignee: Kreyenborg GmbH, Muenster (DE)

( * ) Notice: Subject to any disclaimer, the term of this patent is extended or adjusted under 35 U.S.C. 154(b) by 1127 days.

(21) Appl. No.: 12/275,400

(22) Filed: Nov. 21, 2008

(65) Prior Publication Data

US 2009/0134076 A1    May 28, 2009

(30) Foreign Application Priority Data

Nov. 23, 2007    (DE) .......................... 10 2007 056 594

(51) Int. Cl.
*B01D 24/28*    (2006.01)
(52) U.S. Cl.
USPC ........... 210/359; 210/106; 210/130; 210/131; 210/136; 425/199
(58) Field of Classification Search
USPC ......... 210/106, 130–133, 136–137, 324–331, 210/359, 398–399, 402–404; 425/190–192 S, 196–199
See application file for complete search history.

(56) References Cited

U.S. PATENT DOCUMENTS 3,684,419 A * 8/1972 Voight ...................... 425/192 R

* cited by examiner

*Primary Examiner* — Duane Smith
*Assistant Examiner* — Thomas McKenzie
(74) *Attorney, Agent, or Firm* — Edwards Wildman Palmer LLP; Scott D. Wofsy

(57) ABSTRACT

The invention relates to a screen changer in a system that processes flowable plastic. The screen changer includes an element, such as a portafilter, that is movable between two positions; two hydraulic pumps that effect position change of the screen changer; and a motor that operates both pumps. One pump provides greater flow volume and the other provides a lower flow volume, but with greater pressure. A non-return valve in the supply line to the hydraulic cylinder controls flow to the cylinder that moves the movable element between positions. The volume pump is used to move the movable element when resistance to movement of the screen is low and the high-pressure pump to move the element when resistance is high. The non-return valve selectively enables or interrupts flow from the pumps to the hydraulic cylinder. The screen changer allows use of a non-pressurized hydraulic fluid reservoir.

8 Claims, 1 Drawing Sheet

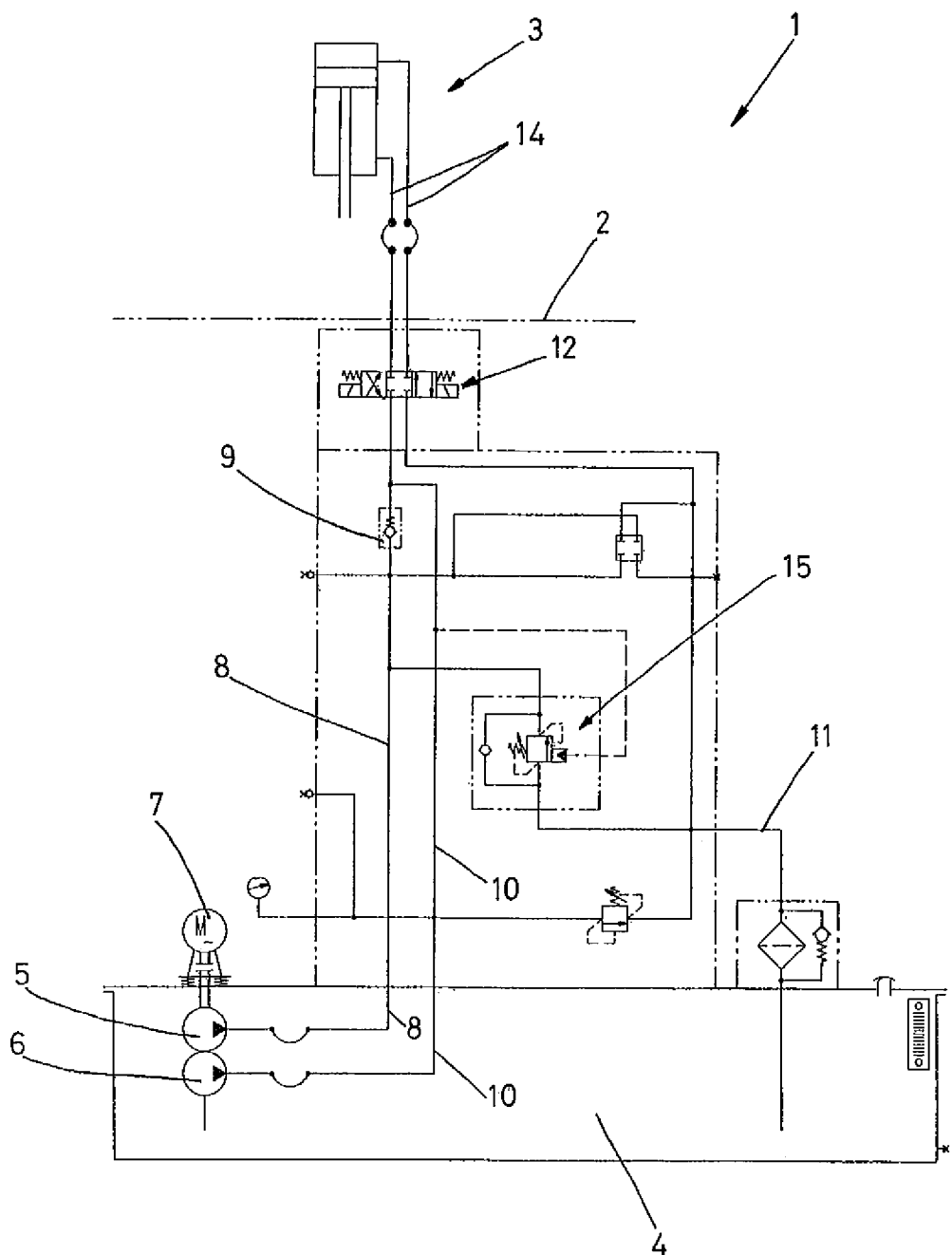

SCREEN CHANGER

BACKGROUND INFORMATION

1. Field of the Invention

The invention relates to a screen changer for use in a system that processes flowable plastic. More particularly, the invention relates to a screen changer that has a movable element that is moved between two positions by a hydraulic cylinder.

2. Description of the Prior Art

Screen changers for use in production systems that process flowable plastic are known in the industry. They use a so-called storage hydraulic and, thus, have a reservoir for hydraulic fluid that can be pressurized. This enables the use of high-pressure pumps that are able to build up a relatively high pressure at relatively low capacity per unit of time. A high pressure is therefore built up over a relatively longer period of time in the hydraulic reservoir, so that a large amount of hydraulic fluid with correspondingly high pressure is made available to the screen changer.

A portafilter can thus be moved or shunted aside a long distance within a short period of time by means of the large amount of fluid, when the screen is to be changed. If the portafilter has two filters, this allows a dirty screen to be moved out of the material feed channel, and, at the same time, a clean screen that provides a high degree of permeability, to be pulled into the material channel. The dirty screen, in this out of the way position, is in the change position, where it is accessible and can be cleaned or, if necessary, exchanged for an unused or previously cleaned screen, while production continues with the clean screen.

The mobility of the portafilter can, however, be hampered, for example, by the adherence of baked-on plastic residues. In such cases, it is necessary to overcome a high resistance to movement, in order to move the portafilter. For this reason the fluid amount stored in the hydraulic reservoir is under the aforementioned high pressure, which makes it possible to overcome such resistance.

It is also necessary to be able to shunt aside a movable component as quickly as possible when operating bypass, start-up, and switching valves in systems that process molten plastic, similar to the shunting movement with portafilters. In these cases, too, however, it may also be necessary to overcome a high resistance, such as an impedance to movement caused by the adhesion of baked-on plastic residues. In general, therefore, components such as portafilters, bypass valves, start-up valves, and switching valves are hereinafter referred to in each case as a "movable element".

It is a disadvantage with conventional screen changers, that the storage hydraulic requires a relatively expensive hydraulic reservoir, which, due to the pressure it must withstand, is relatively expensive to produce and particularly, also requires routine technical inspections. These inspections incur significant follow-up costs and must be performed at regular intervals.

The task of the invention is to improve a generic screen changer such that it can be operated with the lowest possible maintenance costs.

BRIEF SUMMARY OF THE INVENTION

This task is fulfilled by providing a screen changer having two pumps that are operated simultaneously when a movable element needs to be moved.

The invention proposes, in other words, using two pumps that can be operated simultaneously when a movable element, such as a portafilter in a screen changer, needs to be moved. A first pump provides a high flow volume of hydraulic fluid, which, when the portafilter has low resistance, makes it possible to quickly shunt the portafilter aside a relatively great distance within a short period of time. This first hydraulic pump is therefore called the volume pump.

In the case in which there is a higher resistance when shunting the movable element, for example, the aforementioned portafilter, off to the side, then the second hydraulic pump makes it possible to easily shunt aside the portafilter against this resistance. For this purpose, the second hydraulic pump is constructed as a high-pressure pump, which provides a lower flow volume than the volume pump, but makes it possible to build-up a high pressure.

When it is necessary to overcome a high start-up resistance of the portafilter, for example, the high-pressure pump aids in overcoming this resistance. Both pumps, and particularly, the high flow volume of the volume pump, make it possible to move the portafilter aside very quickly. When, conversely, the resistance of the portafilter is higher at the end of the shunt path, then the volume pump initially ensures fast mobility of the portafilter over most of the distance of the travel path, while, at the end, the high-pressure pump makes it possible to shunt the portafilter off to its end position against the prevailing resistance to the shunt travel.

The screen changer according to the invention includes a non-return valve that is arranged in the supply line between the volume pump and the hydraulic cylinder, and a high-pressure line that runs from the high-pressure pump to the hydraulic cylinder. With this configuration, the high-pressure line bypasses the non-return valve, so that, when the non-return valve is closed, the pressure built up by the high-pressure pump does not work against the volume pump, but instead, is exclusively applied to the hydraulic cylinder. When the pressure inside this high-pressure line decreases, however, for example, because the portafilter moves aside with relatively little resistance, the non-return valve is opened. In addition to the flow volume of the high-pressure pump, the flow volume from the volume pump, which has a greater volume compared to that of the high-pressure pump, can now flow through the opened non-return valve and act on the hydraulic cylinder, thus enabling fast shuntability of the portafilter with low travel resistance.

The screen changer according to the invention does not require the use of a hydraulic pressure reservoir; the only requirement is a non-pressurized storage reservoir for the hydraulic fluid. The non-pressurized storage reservoir is not subject to any stringent safety regulations or safety inspections and can supply both hydraulic pumps.

Advantageously, the portafilter can be constructed as a slide plate. Particularly in the case of the embodiment as a slide plate, when two filters are arranged a distance apart from each other, fast shunt paths are required. Also, particularly with slide plates, the resistance to movement is relatively high, at least on certain sections of the shunt path, so that, with this type of screen changer, both high pressure and high volume capacity are required to move the portafilter hydraulically.

Advantageously, the two hydraulic pumps cannot be operated independently of each other, but, rather, are driven simultaneously by the same motor, which results in a structural simplification and cost reduction.

Advantageously, the high-pressure line can run from the high-pressure pump to the supply line and open downstream of the non-return valve into the supply line. In this way, separate line connections to the hydraulic cylinder are not required, i.e., one for the volume line and one for the high-pressure line, so that, for an existing system, no modifications to the hydraulic cylinder are required and the proposed construction can be implemented with minimal technical effort and expense.

Advantageously, the non-return valve can be constructed as a check valve, so that it automatically switches to the switch state required at any one time, thus eliminating the necessity for a relatively complex control for driving the non-return valve. The check valve is thereby constructed such, that it assumes its open position when the pressure on the side of the volume pump is greater than the pressure on the side of the high-pressure pump. This is then the case, for example, when the hydraulic cylinder can be moved with relatively little resistance, so that the relatively low volume of the hydraulic fluid conveyed by the high-pressure pump creates no increase in pressure downstream from the non-return valve. When the resistance of the hydraulic cylinder increases, however, then the pressure downstream from the non-return valve increases, so that an overpressure now prevails on the side of the hydraulic cylinder relative to the pressure built up by the volume pump. Under these pressure conditions, the non-return valve that is constructed as a check valve automatically assumes its closed position, so that the high-pressure pump can now build up the high pressure to act on the hydraulic cylinder, in order to overcome the travel resistance of the portafilter.

Advantageously, the supply line can be connected to a relief valve upstream of the non-return valve. The terms "downstream" and "upstream" as used herein are, of course, referenced from a direction of flow from the pumps to the hydraulic cylinder. When the volume pump is driven together with, or at least simultaneously with, the high-pressure pump, the volume pump is also accordingly switched on and attempting to pump hydraulic fluid when the non-return valve is closed. A type of bypass loop may be provided, in order to prevent an overload and the resulting damage to the volume pump that would occur during this process. When the non-return valve is closed, this bypass loop allows the hydraulic fluid to be pumped from the volume pump back into the storage container holding the hydraulic fluid. A backflow line runs from the relief valve to the storage container for this purpose.

The relief valve opens at a pressure that maximally corresponds to the maximum pressure generated by the volume pump and, in any case, at a pressure that prevails in the supply line when the non-return valve is closed and the volume pump is switched on. The pressure in the supply line decreases as soon as the non-return valve opens. The relief valve closes and the volume pump can act on the hydraulic cylinder.

The relief valve allows the volume pump to run concurrently all the time, without running the risk of overload or damage. This makes it possible to have very short switching times between the hydraulic flow, which flows from the high-pressure pump or the volume pump to the hydraulic cylinder, i.e., very short, compared to a hydraulic switch, which would necessitate switching off the volume pump each time the non-return valve closes, in order to protect the pump, and then switching it on again whenever the non-return valve opens.

BRIEF DESCRIPTION OF THE DRAWINGS

FIG. 1 is a schematic diagram of the hydraulic pump system for the screen changer according to the invention.

DETAILED DESCRIPTION OF THE INVENTION

FIG. 1 illustrates schematically a complete hydraulic pump configuration or system 1 in the form of a hydraulic drawing. The aggregate boundary of this hydraulic pump system 1 is denoted by a boundary 2, indicated by a dot-dash line. A hydraulic cylinder 3 is shown outside the boundary 2 of the hydraulic aggregate. This hydraulic cylinder 3 shunts aside a movable element (not shown). In the embodiment described hereinafter, the movable element is a portafilter for use in production systems that process flowable plastic. The portafilter is constructed as a slide plate, whereby the pump system 1 acts on the hydraulic cylinder 3.

The pump system 1 has a reservoir 4 for storing hydraulic fluid; the reservoir in this embodiment is not constructed as a pressure tank. Two hydraulic pumps that can pump the hydraulic fluid out of the reservoir 4 are disposed within the reservoir 4: First, a volume pump 5 is provided that, for example, has a delivery rate of 80 l/min; and, second, a high-pressure pump 6 is provided that, for example, has a delivery rate of 10 l/min, but is capable of building up a significantly higher hydraulic pressure compared to the pressure built up by the volume pump 5.

The two hydraulic pumps are commonly operated by a single motor 7. This proposed construction of the pump system 1 enables the use of a relatively small motor with relatively low capacity, and eliminates the need for a hydraulic pressure reservoir. The pump system 1 works as follows to operate the hydraulic cylinder 3: The volume pump 5 and the high-pressure pump 6 are driven simultaneously by the motor 7. The volume pump 5 creates a relatively large hydraulic flow volume, which flows through a supply line 8 to the hydraulic cylinder 3. A non-return valve 9 is coupled into the supply line. The non-return valve is constructed as a check valve and is moved to its open position by the volume of flow from the volume pump 5.

The high-pressure pump 6 is actuated simultaneously with the volume pump 8, whereby its high-pressure flow volume flows through a high-pressure line 10 and, downstream from the non-return valve 9, that is, in the direction of flow behind the valve, feeds into the supply line 8. When the hydraulic cylinder 3 presents a high resistance to flow, the pressure between the hydraulic cylinder 3 and the non-return valve 9 increases. This forces the non-return valve 9 to its closed position. The pressure built up by the high-pressure pump 6 can now act on the hydraulic cylinder 3.

The portion of hydraulic fluid displaced by the hydraulic cylinder 3 reaches the reservoir 4 through a backflow line 11.

Two feed-and-return lines 14 are connected to the hydraulic cylinder 3. A reversing valve 12 is provided across these feed-and-return lines 14, in order to selectively feed the flow volume created by the hydraulic pumps 5, 6 into one or the other of two feed and return lines 14. In other words, one of the two lines 14 can selectively serve as the feed line and the other as the return line, depending on the respective switching of the reversing valve 12, whereby the direction of movement of the hydraulic cylinder 3 is determined by selecting the respective feed line 14 and the corresponding return line 14.

The supply line 8 is connected with a relief valve 15 upstream of the non-return valve 9, so that, when the non-return valve 9 is closed, the volume pump 8 pumps the hydraulic fluid in a closed loop back to the reservoir 4, without the hydraulic fluid reaching the hydraulic cylinder 3. Thus, this closed loop is called a bypass loop. The relief valve 15 is connected on the output side to the backflow line 11.

Purely as an example, it is assumed in the embodiment described herein, that the maximum pressure that the volume pump 8 can build up amounts to 140 bar, with a flow volume of 80 l/min, and that the high-pressure pump can create a maximum pressure of 280 bar, with a flow volume of 10 l/min.

The relief valve 15 opens at a so-called switching pressure, which is adjustable and which is set to 140 bar or lower. This switching pressure prevails in the supply line 8 when the non-return valve 9 is closed and the volume pump 8 is switched on. The relief valve 15 closes again as soon as the non-return valve 9 opens and the pressure in the supply line 8 consequently decreases and falls below the value of the switching pressure. The bypass loop is closed and the volume pump 8 resumes acting upon the hydraulic cylinder 3.

The pump system 1 is otherwise similar in many areas in its construction to pump configurations or systems that are already known in the industry, and therefore, not all of the elements of the pump system 1 shown in the drawing need be discussed in detail.

The invention claimed is:

1. A screen changer for apparatus that processes a flowable plastic material, the screen changer comprising:
    a movable element in the form of a portafilter constructed as a slide plate that is movable along a path between two positions;
    a hydraulic cylinder for moving the movable element along the path;
    a supply line for providing hydraulic fluid to the hydraulic cylinder;
    a first hydraulic pump disposed within a reservoir containing hydraulic fluid, designated a volume pump and having a first volume capacity and a first pressure capacity, for pumping hydraulic fluid from the reservoir through the supply line;
    a second hydraulic pump disposed within the reservoir, designated a high pressure pump and having a second volume capacity that is lower than the first volume capacity and a second pressure capacity that is higher than the first pressure capacity, for pumping hydraulic fluid from the reservoir into the supply line;
    a non-return valve in the supply line, the non-return valve selectively opening or interrupting a hydraulic flow path between the volume pump and the hydraulic cylinder;
    a high pressure line which bypasses the non-return valve and feeds hydraulic fluid from the high pressure pump into the supply line downstream from the non-return valve;
    a relief valve connected to the supply line upstream of the non-return valve, so that when the non-return valve is closed, the first hydraulic pump delivers hydraulic fluid in a closed bypass loop back to the reservoir, without the hydraulic fluid reaching the hydraulic cylinder, wherein the relief valve is configured to open at a switching pressure, which is adjustable, and the switching pressure prevails in the supply line when the non-return valve is closed and the first hydraulic pump is switched on, and wherein the relief valve is configured to close when the non-return valve opens and pressure in the supply line falls below the switching pressure;
    two feed and return lines connected to the hydraulic cylinder; and
    a reversing valve downstream from the non-return valve and fed by the supply line for selectively feeding flow volume created by the first and second hydraulic pumps into one or the other of the two feed and return lines, such that one of the two feed and return lines can selectively serve as the feed line and the other as the return line, whereby the direction of movement of the hydraulic cylinder is determined by selecting the feed line and the return line, respectively.

2. The screen changer of claim 1, further comprising a motor, wherein the motor simultaneously drives the volume pump and the high-pressure pump.

3. The screen changer of claim 1, wherein the high-pressure line extends from the high-pressure pump to the supply line and discharges into the supply line downstream of the non-return valve.

4. The screen changer of claim 1, wherein the non-return valve is constructed as a check valve; and wherein the check valve opens automatically when an overpressure prevails upstream of the check valve and closes automatically when an overpressure prevails downstream of the check valve.

5. The screen changer of claim 1, wherein the relief valve is placed in a backflow line and wherein the backflow line discharges hydraulic fluid into the reservoir.

6. The screen changer of claim 5, wherein the reservoir is a non-pressurized hydraulic fluid reservoir.

7. The screen changer of claim 5, wherein the first hydraulic pump and the second hydraulic pump each draw fluid from the hydraulic fluid reservoir, independently of each other.

8. The screen changer of claim 5, wherein the first hydraulic pump and the second hydraulic pump simultaneously pump fluid.

* * * * *